Figure 1:
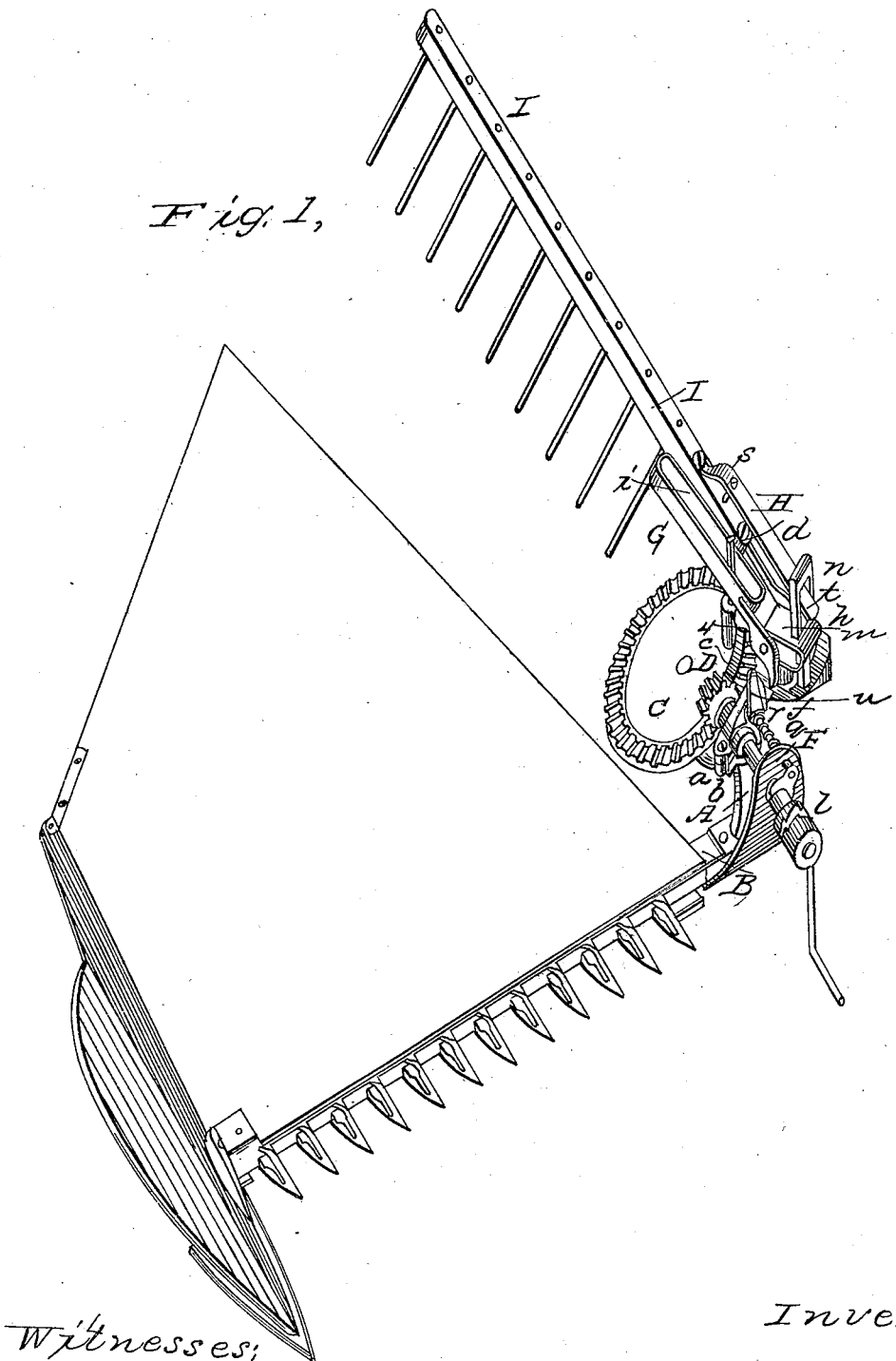

O. H. BURDICK.
Harvester Rake.

No. 43,007.

2 Sheets—Sheet 1.

Patented June 7, 1864.

Witnesses:
Jm. A. Patten
A. Moore

Inventor:
O. H. Burdick,
By atty A. B. Stoughton.

O. H. BURDICK.
Harvester Rake.
No. 43,007.
2 Sheets—Sheet 2.
Patented June 7, 1864.
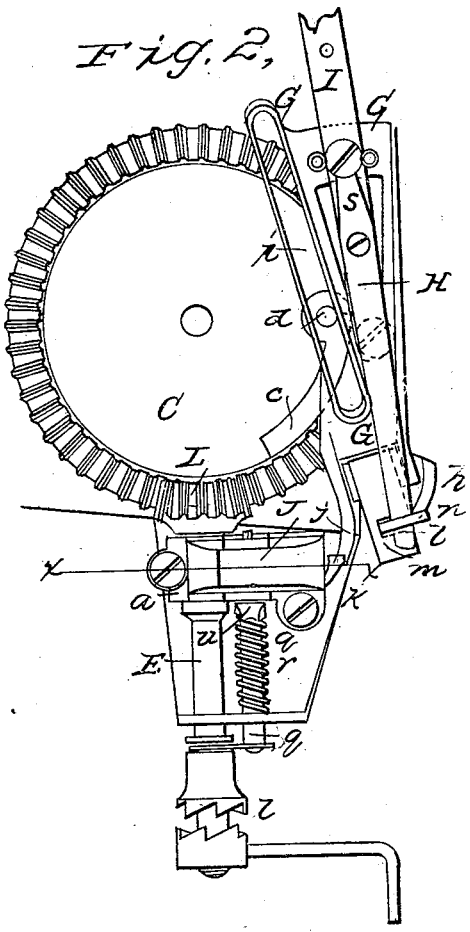
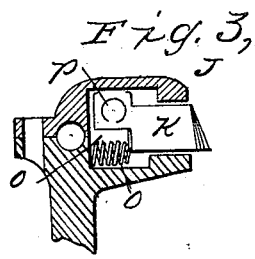
Witnesses:
Tho. A. Patten
H. Moore
Inventor.
O. H. Burdick
By atty. A. B. Stoughton.

UNITED STATES PATENT OFFICE.

O. H. BURDICK, OF AUBURN, NEW YORK.

IMPROVEMENT IN RAKES FOR HARVESTERS.

Specification forming part of Letters Patent No. 43,007, dated June 7, 1864.

*To all whom it may concern:*

Be it known that I, O. H. BURDICK, of Auburn, in the county of Cayuga and State of New York, have invented certain new and useful Improvements in Rakes for Harvesting-Machines; and I do hereby declare the following to be a full, clear, and exact description of the construction and operation of the same, reference being had to the accompanying drawings, making a part of this specification, in which—

Figure 1 represents in perspective so much of the platform and cutting mechanism of a harvesting-machine as will illustrate the operation of my rake in connection therewith. Fig. 2 represents a top plan of the rake mechanism, and on an enlarged scale; and Fig. 3 represents a section through the trigger or tripping mechanism, taken at the red line $x\ x$ of Fig. 1.

Similar letters of reference, where they occur in the separate figures, denote like parts of the apparatus in all cases.

My invention relates, first, to a spring or its equivalent for holding the rake to its work while sweeping the platform, and releasing the rake when it is being raised up to return for the next operation.

It further relates to the arrangement of two cams—one on the gear-wheel and the other on the rake-plate—for the purpose of giving the rake its rising and falling motion.

It further relates to the construction of a rake-plate having a cam and slot upon it, and an adjustment for the rake on the rake-plate, so that the sweep of the rake may be changed without changing the sweep of the rake-plate; and, finally, it relates to a tripping mechanism by which the rake is thrown into gear by the operator after it has thrown itself out of gear at the end of its sweep or over its delivery-point.

To enable others skilled in the art to make and use my invention, I will proceed to describe the same with reference to the drawings.

On a standard or post, A, arranged on the main-frame end of the finger-bar B, or in a line therewith, is placed a horizontal bevel-gear, C, with which a bevel-pinion, D, on a shaft, E, works, said shaft receiving its motion from the main drive-wheel by any of the known mechanical appliances, and supported and turning in a box or bearing, $a$, on an arm, $b$, projecting from the standard or post A, and in a runner, shoe, or bent-up piece, F, connected to the finger-bar or to the main frame. The bevel-gear C carries on its face a cam, $c$, and a guide-pin, $d$, for a purpose to be presently described.

An upright short post, $e$, is affixed to an arm, $f$, projecting from the standard A, to which is hinged at $g$ a rake-plate, G, and to this arm $f$ is also connected a stationary cam, $h$, that expands and contracts a spring, H, for holding and releasing the hinged rake I at suitable and proper intervals during its traversing movement.

The rake-plate G, to which the rake I is connected, has adjusting-holes 1 2 3 in it, by which the rake may be set more toward or from the cutting-line without changing the plate itself, which is essential, inasmuch as the plate has other duties to perform which do not admit of a change in its position without complication of its parts. The rake-plate, moreover, has connected to or with it a long slot, $i$, through which the pin $d$ traverses, a cam, 4, against and with which the cam $c$ works for raising and lowering the rake, a tail-piece, $j$, for working a spring-bolt, $k$, to disconnect the clutch $l$ on the shaft D, and thus throw the rake out of motion, and a guide-piece, $m$, through which the sliding piece $n$ works to compress or relax the spring H, said sliding piece $n$ working against the face of the stationary cam $h$ for that purpose.

In the box J is placed the bolt $k$, by which the clutch $l$ is thrown out of and into connection at the will of the driver or operator to stop, start, or keep in constant motion the rake. This bolt $k$ is forced out by a spring, $o$, behind it, and it has an opening, $p$, through it, which receives the clutch-rod $q$ when in a certain position, and the clutch-rod is not restrained by the driver or conductor and only affected by its spring $r$, as will be explained in the operation of the rake.

The spring H is fastened at its heel $s$ to the rake-head I, while its point $t$ rests in the piece $n$ and rises and falls with said piece as it in turn is influenced by the cam $h$.

The clutch rod or shaft $q$ has upon it a foot-piece, $u$, which the driver or conductor from his seat may easily reach and control by his foot for convenience, but may be as readily arranged to be operated by his hand.

The operation of the rake is as follows: Supposing the rake to be in the position shown in the drawings, which is over the delivery-point of the gavel just swept off, and to be in a state of rest as it disconnects itself from the driving-gear at this point, the driver or conductor with his foot presses against the piece $u$, which throws in the clutch $l$, and the rake in its raised or elevated position immediately commences to swing around toward the front of the platform, and in doing so the piece $n$ raises upon the cam $h$, carrying up with it the point $t$ of the spring $H$, and correspondingly causing said spring to press or throw the rake down upon the platform; but the cams $c$ 4 being in contact, the rake cannot fall any faster than the slopes of these cams will allow until the cam $c$ has passed out from under the cam 4, when the spring $H$, having then its full tension, (as the piece $n$ has reached the highest point of the cam $h$,) forces and holds down the rake to the platform until it reaches to near the end of its sweep. By this time the piece $n$ has run down on its cam, relaxing the spring $H$, and the cam $c$, having come around, takes against the cam 4 on the rake-plate $G$, and raises up the rake for the next return motion. If the rake is to rest after each traverse of the platform to allow sufficient grain to gather to make a gavel, it is only necessary for the operator to remove his foot from the piece $u$, and then the tail-piece $j$, when the rake has arrived at or near the end of its traverse, comes against the bolt $k$, pushing it into its box J until the opening $p$ comes opposite to the clutch rod or shaft $q$, when the spring $r$ immediately shoots it into said opening, disconnecting the clutch $l$, and the rake stands at rest until the driver presses against the piece $u$, when it immediately starts again. If the rake is to run constantly, the driver should keep his foot pressed against the piece $u$ or fasten the clutch in gear. If the pressure of the spring $H$ were uniform and continuous, it would require considerable power to raise up the rake against its resistance. I avoid this by making the spring an acting and non-acting medium at intervals. When a single cam is used on the gear-wheel to raise up and let down the rake it is invariably done with a blow or jar, which is very injurious to the rake; but by using the two cams—that is to say, one cam on the gear-wheel and one on the rake-plate—the motion is easy and without jar.

Having thus fully described my invention, what I claim therein as new, and desire to secure by Letters Patent, is—

1. In combination with a rising and falling rake, a spring that is mechanically compressed and relaxed to hold the rake to the platform and to release it when it is to be raised up, substantially as described.

2. The combination of the cam and pin $c$ $d$ on the gear C with the cam and slot 4 $i$ on the rake-plate for procuring an easy traverse and rising and falling motion to the rake, as described.

3. A rake-plate constructed with a cam, a slot, and an adjustment for the rake, so that while the rake may be set more toward or from the grain the cam and slot may continue to work with their co-operative parts without interruption, substantially as described.

4. In combination with a clutch, the spring-bolt $k$ and the tail-piece $j$, so that the rake may throw itself out of action at the end of every stroke or be continued in action at the will of the driver or conductor, substantially as described.

O. H. BURDICK.

Witnesses:
J. H. OSBORNE,
D. M. OSBORNE.